United States Patent
Furumoto et al.

[15] 3,659,225
[45] Apr. 25, 1972

[54] OPTICAL PUMP AND DRIVER SYSTEM FOR LASERS

[72] Inventors: Horace W. Furumoto, Wellesley; Harry L. Ceccon, Boston, both of Mass.

[73] Assignee: The United States of America as represented by the Administrator of the National Aeronautics and Space Administration

[22] Filed: May 21, 1970

[21] Appl. No.: 39,185

[52] U.S. Cl. .................................. 332/7.51, 331/94.5
[51] Int. Cl. .................................. H01s 3/00, H01s 3/09
[58] Field of Search .................................. 181/5; 332/7.51

[56] References Cited

UNITED STATES PATENTS 3,428,860  2/1969  Mastrup .................................. 315/111

OTHER PUBLICATIONS

H. Furumato, A high performace flashlamp for Organic Dye Laser 5/26/69 page 17, IEEE-JOM No. 6 page 17
Sarakin Flashlamps Excitation of Organic Dye Lasers March 3, 1967 page 143 IBM Journal II

*Primary Examiner*—Rodney D. Bennett, Jr.
*Assistant Examiner*—N. Moskowitz
*Attorney*—Herbert E. Farmer and John R. Manning

[57] ABSTRACT

Disclosed is a laser pumping system including a xenon filled coaxial flashlamp mounted on a driver assembly including a cylindrical capacitor and integrally mounted spark gap switch. Low inductance plates are used to connect the driver to the flashlamp. Because of low inductance circuitry and the use of a switch to prevent premature breakdown of the xenon gas, an extremely uniform high power discharge is created in the flashlamp by a photoionization process.

15 Claims, 4 Drawing Figures

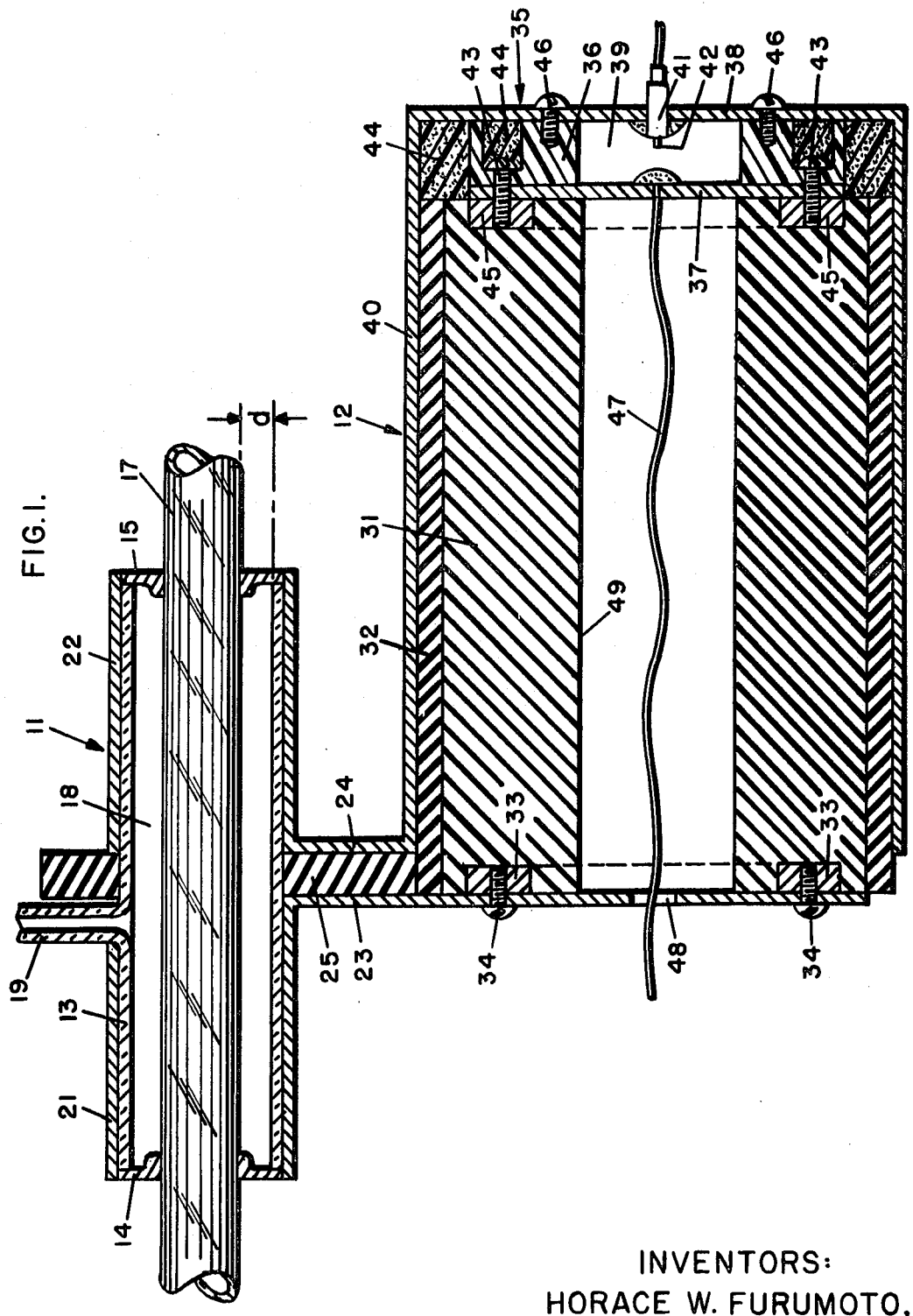

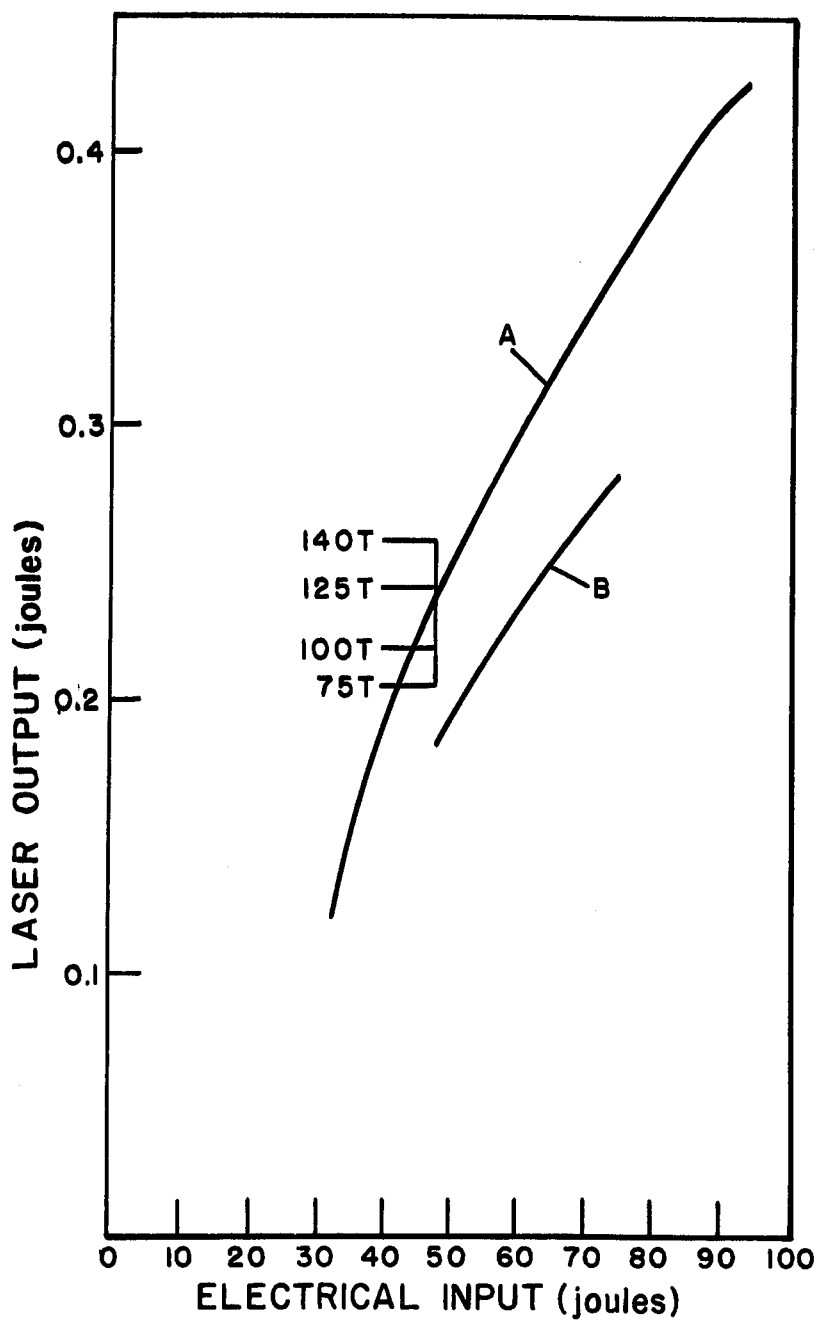

OPTICAL PUMP AND DRIVER SYSTEM FOR LASERS

ORIGIN OF THE INVENTION

The invention described herein was made by employees of the United States Government and may be manufactured and used by or for the government for governmental purposes without the payment of any royalties thereon or therefor.

BACKGROUND OF THE INVENTION

This invention relates generally to optical pump systems and more particularly to ultra fast flashlamp systems especially suitable for optically pumping organic dye lasers.

After discovering that organic dyes could be optically pumped to laser thresholds, a key interest developed in organic dye lasers. Because of its simplicity, high power output, tunability and narrow band capability, the dye laser has become an important tool in fields such as spectroscopy and nonlinear optics. The full potential of dye lasers has not been realized, however, primarily because of its requirements for high optical pump power.

Most useful organic dye laser systems have employed other lasers to supply optical pump power. Flashlamp pumped dye lasers, although capable of providing increased efficiency, have not come into extensive use because of various inherent flashlamp problems. For example, coaxial flashlamps suffer from filament formation, i.e., the discharge does not fill the lamp uniformly. For this reason, the outputs of previous coaxial flashlamp pumped dye lasers have been erratic, not uniform, and highly divergent. In addition, destruction of coaxial flashlamps by the laser output has been common in such systems unless extra heavy tubings were used. Linear flashlamps also have been tried as pumps for organic dye lasers. The relatively slow rise time of linear lamps seriously limits the efficiency of these systems, however.

The object of this invention, therefore, is to provide an improved ultra fast flashlamp that can be effectively used as an optical pump for organic dye lasers.

SUMMARY OF THE INVENTION

The invention is characterized by the provision of an optical pumping system comprising a xenon filled coaxial flashlamp directly mounted on a driver capacitor and electrically connected thereto with relatively massive connector plates that possess extremely low inductance. Integrally formed with the capacitor is a pressurized spark gap switch that is triggered to dump high power pulses into the flashlamp. The use of the switch to prevent premature breakdown of the xenon and the low driver circuit inductance permit ultra fast high power discharges. A resultant photoionization process completely fills the coaxial flashlamp discharge volume and creates a uniform efficient laser output.

According to a featured embodiment of the invention, the driver capacitor is a cylindrical capacitor having one plate terminal integrally formed with a plate contact of the spark gap switch. The other plate contact of the switch is integrally formed with a cylindrical conductive shell that surrounds the cylindrical capacitor and is connected to one of the flashlamp electrodes by a relatively massive connector plate. This compact structure provides the low circuit inductance required to establish the ultra fast power discharge rise times desired.

The invention is further characterized by the provision of a coaxial flashlamp enclosing and coaxially aligned with a tubular laser body being pumped. The radial spacing between the outer surface of the laser body and the inner surface of the flashlamp is fixed at between 15 and 25 mils. It has been found that this annular spacing is highly critical to laser operation with variations of a few thousands of an inch changing output efficiency by as much as 100 percent.

Another feature of the invention is the provision of a coaxial flashlamp of the above described type with electrodes formed of an electrically conductive material with a melting point above 2,500° C. The use of high temperature melting electrodes prevents sputtering damage during the extensive discharge periods experienced by the lamp.

DESCRIPTION OF THE DRAWINGS

These and other objects and features of the present invention will become more apparent upon a perusal of the following description of the accompanying drawings wherein:

FIG. 1 is a schematic cross-sectional view of a preferred coaxial flashlamp and electrical driver assembly embodiment of the invention;

FIG. 3 is a graph plotting laser output vs. electrical input for the embodiment shown in FIG. 1.

DESCRIPTION OF THE PREFERRED EMBODIMENT

Figure 4:
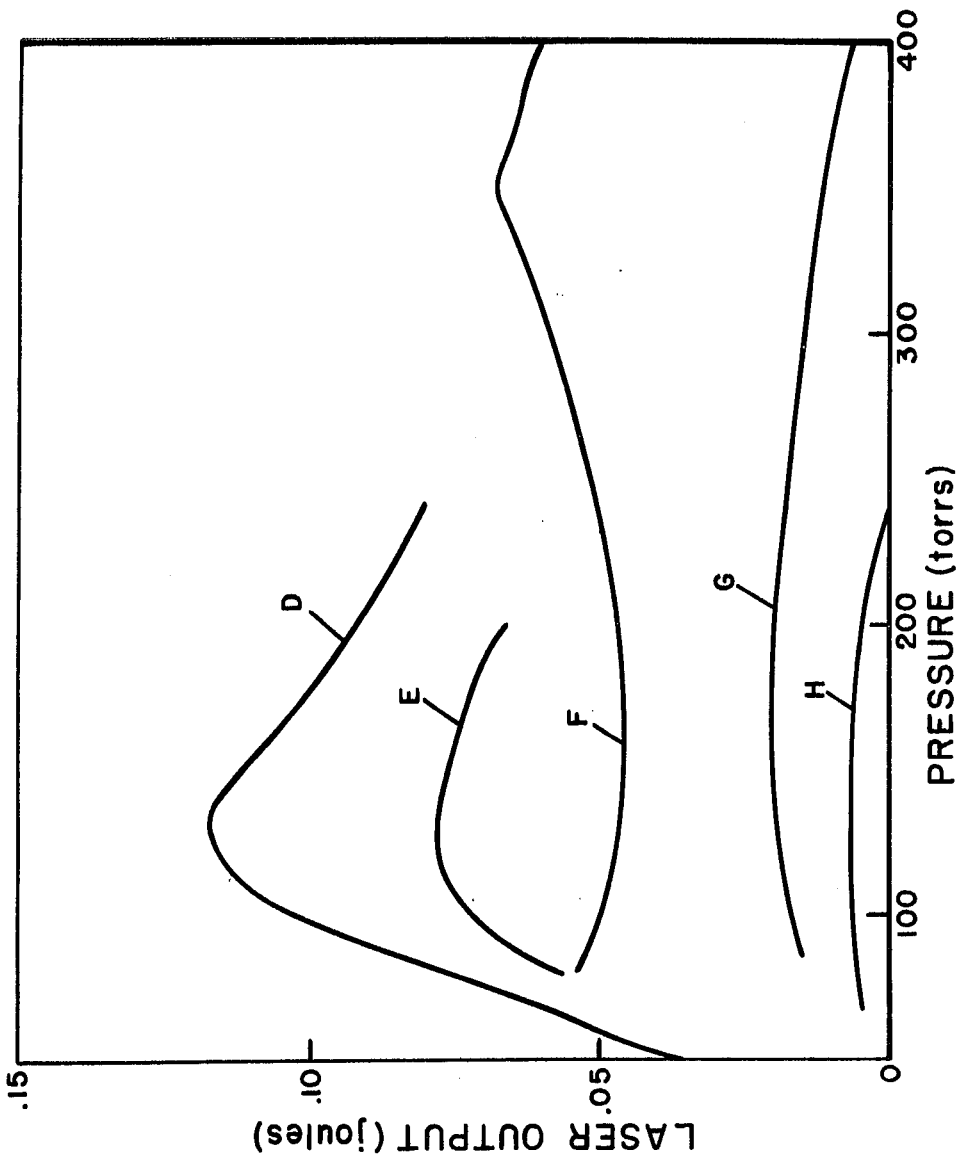
FIG. 4 is a graph plotting laser output vs. pressure for a number of flashlamp fill gases and sizes.

Referring now to FIG. 1, a coaxial flashlamp assembly 11 is mounted directly on a cylindrical capacitor 12. The flashlamp assembly 11 includes a hollow glass pump tube 13 having its opposite ends closed by circular electrodes 14 and 15. Extending coaxially through the hermetically sealed pump tube 13 and through central apertures in the electrodes 14 and 15 is a partially shown cylindrical laser body 17. A fill gas at a desired pressure is introduced into the pump cavity 18 through an inlet port 19 connected to a suitable vacuum system (not shown). In intimate contact with the outer surface of the pump tube 13 are a pair of hollow conductive tubes 21 and 22 having ends electrically connected to, respectively, the pump electrodes 14 and 15. The opposite ends of the conductor tubes 21 and 22 are connected to, respectively, conductor plates 23 and 24 that are separated by an insulator block 25.

The drive capacitor 12 includes a metal and dielectric core 31 surrounded by a phenolic case 32. An annular capacitor terminal 33 embedded in the core 31 is integrally attached to the connector plate 23 by a plurality of circumferentially distributed bolts 34. Mounted directly to the opposite end of the capacitor 12 is a spark gap switch assembly 35. Included in the switch assembly 35 is a lucite ring 36 hermetically sealed between circular contact plates 37 and 38. A switch cavity 39 formed between the contact plates 37 and 38 is filled with an ionizable gas under pressure. Extending into the cavity 39 through an insulator feed-through 41 is a trigger electrode wire 42. The switch assembly 35 is secured to the capacitor 12 by a plurality of circumferentially distributed bolts 43 that extend through the lucite ring 36 and into the capacitor terminal 45. The bolts 43 are in counterbored holes in the lucite ring 36 with bolt heads below the surface of the lucite ring 36. The bolt heads 43 are insulated from the switch contact plate 38 by epoxy insulation 44 that fills the counterbored holes. The capacitor ring terminal 45 is integrally attached in close contact relationship with the switch contact plate 37. A plurality of circumferentially distributed bolts 46 that are off set from bolts 43 hold switch contact plate 38 to the lucite ring 36 by means of blind, tapped bolt holes in the lucite ring 36. The electrically conductive shell portion 40 is electrically connected to the switch plate 38, surrounds the capacitor case 32 and is electrically connected to the connector plate 24. A high voltage lead 47 extends through a central aperture 48 and a central bore 49 in the core 31 for connection to the switch contact plate 37.

Figure 2:
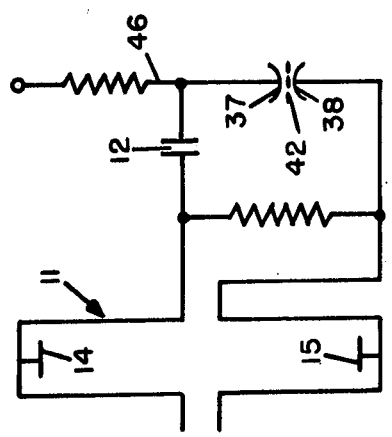
FIG. 2 is a schematic circuit diagram of the embodiment shown in FIG. 1.

A circuit diagram for the system shown in FIG. 1 is illustrated in FIG. 2 and components common to both FIGURES bear the same reference numeral. During typical operation, a high voltage applied on line 47 induces a charge buildup in the capacitor 12. After a predetermined time period, a triggering pulse is applied to the switch 35 on the electrode wire 42 resulting in ionization of the gas in the switch cavity 39. The resultant arc formed between the contact plates 37 and 38 closes a circuit between the capacitor 12 and the electrodes 14 and 15 of the coaxial flashlamp 11. As described more fully below, the ultra fast, high power discharge of the capacitor 12 produces a photoionization process that uniformly fills the annular pump cavity 18 with discharge.

Features of the invention leading to a fast, high power discharge include the extremely low circuit inductance provided by the compact mounting of components and the absence of wire leads. Also important is the close coupling between input current and lamp discharge current provided by the conductor shells 21 and 22 in intimate contact with the pump shell 13. Still other features contributing to the overall effectiveness of the system are the selection of a lamp fill gas that has a low photoionization threshold and of sputter-resistant lamp electrode materials. Xenon and radon are preferred lamp fill gases while conductive materials with melting points above 2,500° C such as tungsten, tantalum or molybdenum are preferred for the pump electrodes. As also described more fully below, the size of the annular pump cavity 18 as determined by a radial spacing $d$ (FIG. 1) between the outer surface of the laser body 17 and the inner surface of the pump tube 13 is highly critical. For optimum pump performance it is preferred that the distance $d$ be fixed at between 15 and 25 mils.

Specific embodiments of the system shown in FIG. 1 included a flashlamp 11 either 6 or 12 cm long and with a double-wall quartz tube 13. The double wall included a 1.5 mm thick outer wall and a 1 mm thick inner wall while arc channel thickness (difference in radii) was varied from 0.25 mm to 1 mm. The conductor tubes 21 and 22 were formed either by vapor deposition of aluminum to a thickness ranging between 0.1 mm to 0.25 mm or by tightly wrapped aluminum or silver foil. Copper-impregnated tungsten was used for the electrodes 14 and 15 which were sealed to the tube 13 in a manner that prevented contact between the sealing epoxy and the discharge plasma. Research grade xenon was used as a fill gas.

The output energies from a $5 \times 10^{-5}$ M solution of rhodamine 6G in dye laser systems utilizing this flashlamp system with 6 and 12 cm flashlamps are shown by curves A and B, respectively, in FIG. 3. A calorimeter was used to measure the energy output. The xenon gas pressure was optimized for 18 kV for the short lamp and kept constant for the various energy loading, but no optimization was attempted for the longer lamp. Later, a variation of pressure run at fixed pump energy was taken on the longer lamp. If the gas pressure were varied for optimum performance at each voltage level, the slope efficiency would perhaps be more nearly a constant. Arc channel thickness was 0.46 mm for the 6-cm lamp and 0.45 mm for the 12-cm lamp. The dye cells were 10 cm and 16 cm long with antireflection-coated windows, and the laser resonator consisted of flat dielectric mirrors coated for 100 percent and 60 percent reflectivity and spaced approximately 30 cm apart. Far-field measurements employing the technique developed by Avizonis et al. [P. V. Avizonis, T. T. Doss, and R. Heimlich, Rev. Sci. Instrum. 38,331 (1967)] were used to measure beam divergence which are tabulated in Table I below.

Table I. Beam Divergence Measurements

| Identification | Mirror spacing (cm) | Output[a] (joules) | Full angle divergence (milliradians) |
|---|---|---|---|
| 1-3-3 | 110 | — | 1.9 |
| 1-3-7 | 110 | — | 1.7 |
| 1-8-1 | 100 | 0.075 | 1.8 |
| 1-8-2 | 100 | 0.075 | 2.3 |
| 1-8-3 | 50 | 0.10 | 2.6 |

[a]constant pump energy at 50J.

From the laser output performance, it is evident that the coaxial lamp with the xenon fill was discharging uniformly. Kerr cell photographs comparing presumed uniform and filamentary discharges proved without a doubt that a uniform discharge could be obtained, and that accompanying a uniform discharge a characteristic signature accompanied the discharge current trace. The signature of a uniform discharge is hash on the trace with a maximum $di/dt$ at initiation, while a filamentary discharge showed a toe at initiation and a smooth current race.

FIG. 4 shows the effect of different fill gases and sizes of the annular spacing $d$ (FIG. 1) on the performance of a 6 cm lamp. Curve D represents xenon gas with an 0.5 mm spacing; curve E represents krypton gas with an 0.5 mm spacing; curve F represents xenon gas with a 1.0 mm spacing; curve G represents argon gas with an 0.5 mm spacing; and curve H represents argon gas with a 1.0 mm spacing. The 0.5 mm spacing was better than the 1-mm thick discharge. Subsequent tests showed that the optimum spacing for a 6-cm lamp was in the order of 0.30–0.35 mm, and approximately 0.45 mm for the 12-cm lamp. For too thick a discharge annulus, the output efficiency was lower because the lower discharge resistance increased the electrical mismatch between the lamp and the driver circuit which was established to be 0.3Ω. With a discharge annulus less than 0.3 mm, the surface to volume ratio increased to the point where the plasma cooled sufficiently to decrease brightness, and the increase in plasma resistance reduced the current flow. The lamp then operated in the over-damped mode with a consequent loss in power transfer efficiency. In principle, there should be a point at which there is an optimum pressure, discharge annulus, thickness, and lamp length so the system would be close to being critically damped, but critically damping was not observed for the various lamp embodiments described above.

In recent years Raether's Kanalaufbau [H. Raether, "Electron Avalanches and Breakdown in Gases," Butterworth Press, Washington, D. C., 1964, Chapt. 5; F. Llewellyn-Jones "Ionization and Breakdown in Gases," (Metheuen Company, London, 1957), Chapt. 5] or kanal theory and similarly the streamer theory [L. Loeb, "Fundamental Processes of Electrical Discharges in Gases" (John Wiley & Sons, Inc., New York 1939), pp 4266-4432] have been applied to explain the rapid radial growth of an electron avalanche. In this model, the electrons accelerated in the impressed electric field across a gas start an avalanche similar to a Townsend discharge. At high fields and high current amplification rates the external field is soon modified by space charge effects. The plasma is distorted by the external field into a dipole, and local fields greater than the external applied field are produced. Meanwhile, high energy uv photons are being released by collisions and recombinations within the plasma cloud. The photons emanating from the plasma ionize the neutral gas surrounding the plasma, and the electronic products of the ionization are rapidly accelerated toward the positive head of the plasma cloud, suffering ionizing collisions on the way. Each of the secondary channels can likewise repeat the process.

In the analysis of Kanalaufbau, investigators have used uniform fields, or slight modification of uniform fields. In addition, currents were kept low for diagnostic purposes, so that self and mutual inductances as well as magnetic field effects could be ignored. The fast flashlamp, on the other hand, is primarily a high current process, and self-inductance is a dominant parameter. The high current discharges, consequently, develop high magnetic fields which cannot be ignored. Despite the difference, the kanal theory, modified to include the presence of magnetic field effects can qualitatively explain the processes observed during the discharge of the present coaxial lamp.

In the fast, coaxial lamp system described herein, the discharge starts in the manner described above for the kanal theory. However, the discharge is confined to the narrow annular channel 18 between the two walls so any blooming of the streamer tends to fill the discharge volume quickly. This process is aided by the magnetic field generated by the outer current tubes 21 and 22 which tend to channel electrons azimuthally toward regions of low or no current density. The aximuthal magnetic field tends to uniformly distribute the plasma current sheet. Because of this uniform distribution, the self-inductance of the lamp 11 can easily decrease by an order of magnitude from the value given by a single filament. The current can then rise rapidly because of the decrease in inductance of the lamp, and the increased current increases kanal formation. The stored energy in the capacitor 12 can be rapidly depleted in this self-propagating process. The current pulse is not expected to be a simple exponential, and the characteristic toe of a Townsend discharge current is not observed.

Photoionization of the gas is the dominant electron producing mechanism in a discharge of xenon and krypton. It is desirable that photoionization of the xenon gas occurs. The electron or plasma temperature of the discharge is in the neighborhood of 2.5–3.0 eV, where the peak of a blackbody radiation spectra coincides with the photoionization threshold of xenon. The success of xenon and to a lesser degree krypton over argon seem to indicate that a threshold criterion exists.

Thus, the present invention provides a laser pumping system of simple construction from readily available components of modest cost. Its performance, reliability, and compactness coupled with the virtues of dye lasers, in general, such as its tunability make it an excellent light source when a synchronizable, pulsed light source of high spectral brightness is needed. In addition, the subsystem composed of the capacitor and spark gap switch is a simple, fast, and durable electric driver with convenient terminations for low impedance striplines.

Obviously, many modifications and variations of the present invention are possible in light of the above teachings. It is to be understood, therefore, that the invention can be practiced otherwise than as specifically described.

What is claimed is:

1. An optical pump system comprising:
   a. a hollow hermetically sealed flashlamp casing;
   b. first and second electrodes disposed in said casing for producing an electric field therein;
   c. driver capacitor means having first ad second terminals;
   d. first low inductance electrical connector means connecting said first electrode to said first terminal;
   e. electrical switch means formed integrally with said capacitor means;
   f. second low inductance electrical connector means connecting said switch means between said second terminal and said second electrode;
   g. and switch control means for actuating said electrical switch means.

2. An optical pump system according to claim 1 wherein said electrical switch means comprises first and second plate contacts separated by an ionizable gas filled cavity, and said switch control means comprises a trigger electrode for inducing ionization of said gas.

3. An optical pump system according to claim 2 wherein said first plate contact and said second terminal are formed as an integral unit.

4. An optical pump system according to claim 3 wherein said driver capacitor means comprises a cylindrical capacitor with a cylindrical dielectric body separating conductive plates that comprise said first and second terminals.

5. An optical pump system according to claim 4 wherein said second electrical connector means comprises an electrically conductive cylindrical shell enclosing said dielectric body and having an end wall integral with said second contact.

6. An optical pump system according to claim 5 wherein said first and second electrical connector means each comprise a connector plate extending between said driver capacitor and said flashlamp housing, and said connector plates are formed integrally with, respectively, said first terminal and said conductive shell.

7. An optical pump system comprising:
   a. a hollow hermetically sealed xenon filled flashlamp casing;
   b. first and second electrodes disposed in said casing for producing an electric field therein; said first and second electrodes formed of an electrically conductive material with a melting point above 2,500° C;
   c. driver capacitor means having first and second terminals;
   d. first low inductance electrical connector means connecting said first electrode to said first terminal;
   e. electrical switch means;
   f. second low inductance electrical connector means connecting said switch means between said second terminal and said second electrode;
   g. and switch control means for actuating said electrical switch means.

8. An optical pump system according to claim 7 wherein said casing comprises a cylindrical pump tube, said first and second electrodes are positioned at opposite ends of said pump tube, and including a cylindrical laser body extending axially through said cylindrical pump tube, and wherein the radial spacing between the outer surface of said cylindrical laser body and the inner surface of said cylindrical pump tube is between 15 and 25 mils.

9. An optical pump system according to claim 8 wherein said first and second electrical connector means comprise hollow conductor tube means surrounding and in intimate contact with the outer surface of said pump tube.

10. An optical pump system according to claim 8 wherein said switch means is formed integrally with said capacitor means.

11. An optical pump system according to claim 10 wherein said electrical switch means comprises first and second plate contacts separated by an ionizable gas filled cavity, and said switch control means comprises a trigger electrode for inducing ionization of said gas.

12. An optical pump system according to claim 11 wherein said first plate contact and said second terminal are formed as an integral unit.

13. An optical pump system according to claim 12 wherein said driver capacitor means comprises a cylindrical capacitor with a cylindrical dielectric body separating conductive plates that comprise said first and second terminals.

14. An optical pump system according to claim 13 wherein said second electrical connector means comprises an electrically conductive cylindrical shell enclosing said dielectric body and having an end wall integral with said second contact.

15. An optical pump system according to claim 14 wherein said first and second electrical connector means each comprise a connector plate extending between said driver capacitor and said flashlamp housing, and said connector plates are formed integrally with, respectively, said first terminal and said conductive shell.

* * * * *